Sept. 21, 1971     G. J. ORLOWSKI     3,606,917
PEELING MACHINE

Filed May 26, 1969     4 Sheets-Sheet 1

INVENTOR.
GERALD J. ORLOWSKI
BY
ATTORNEYS

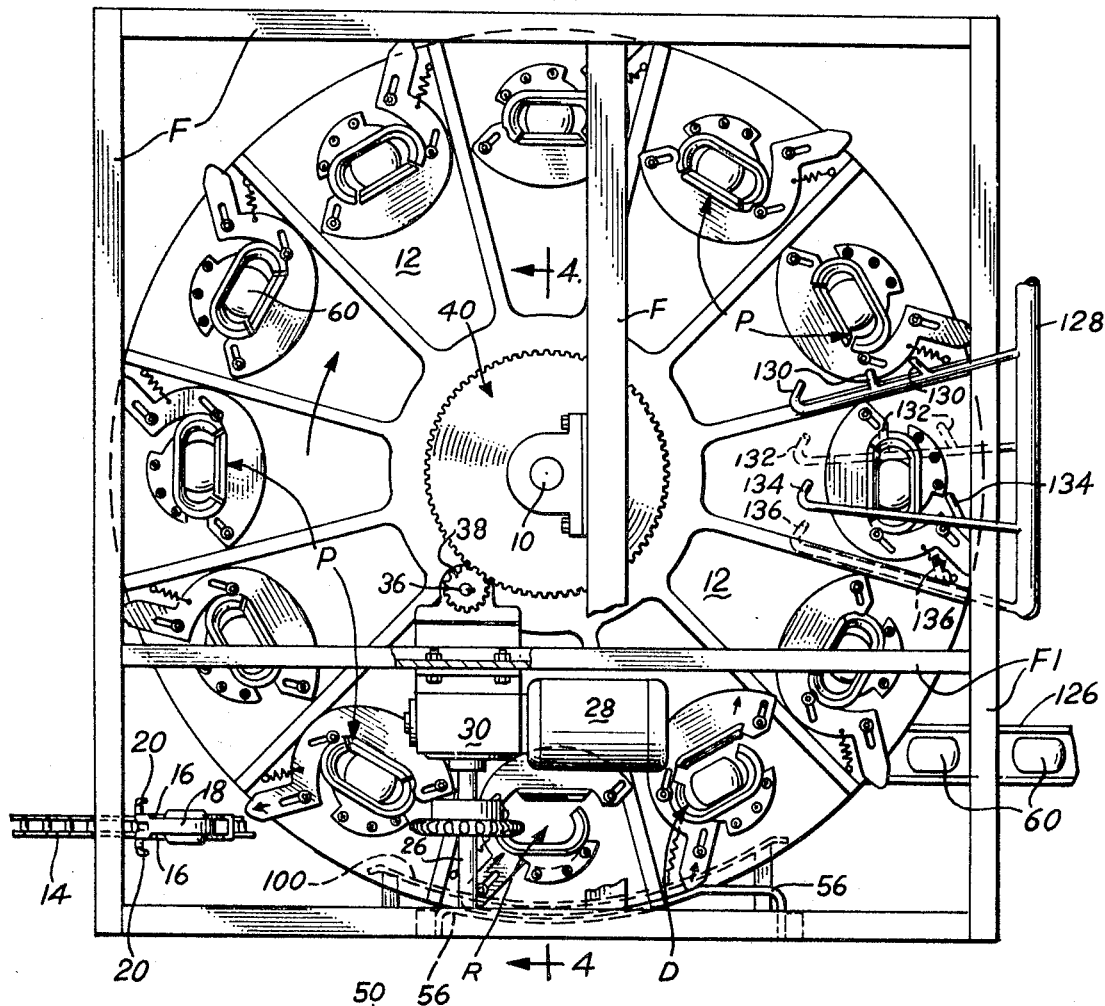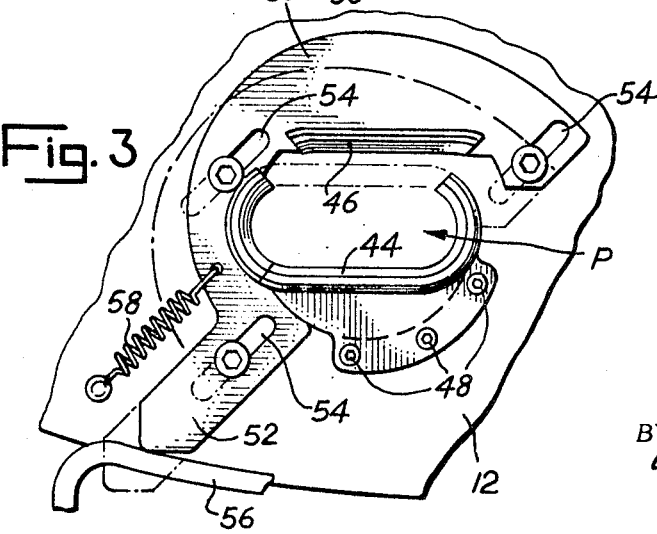

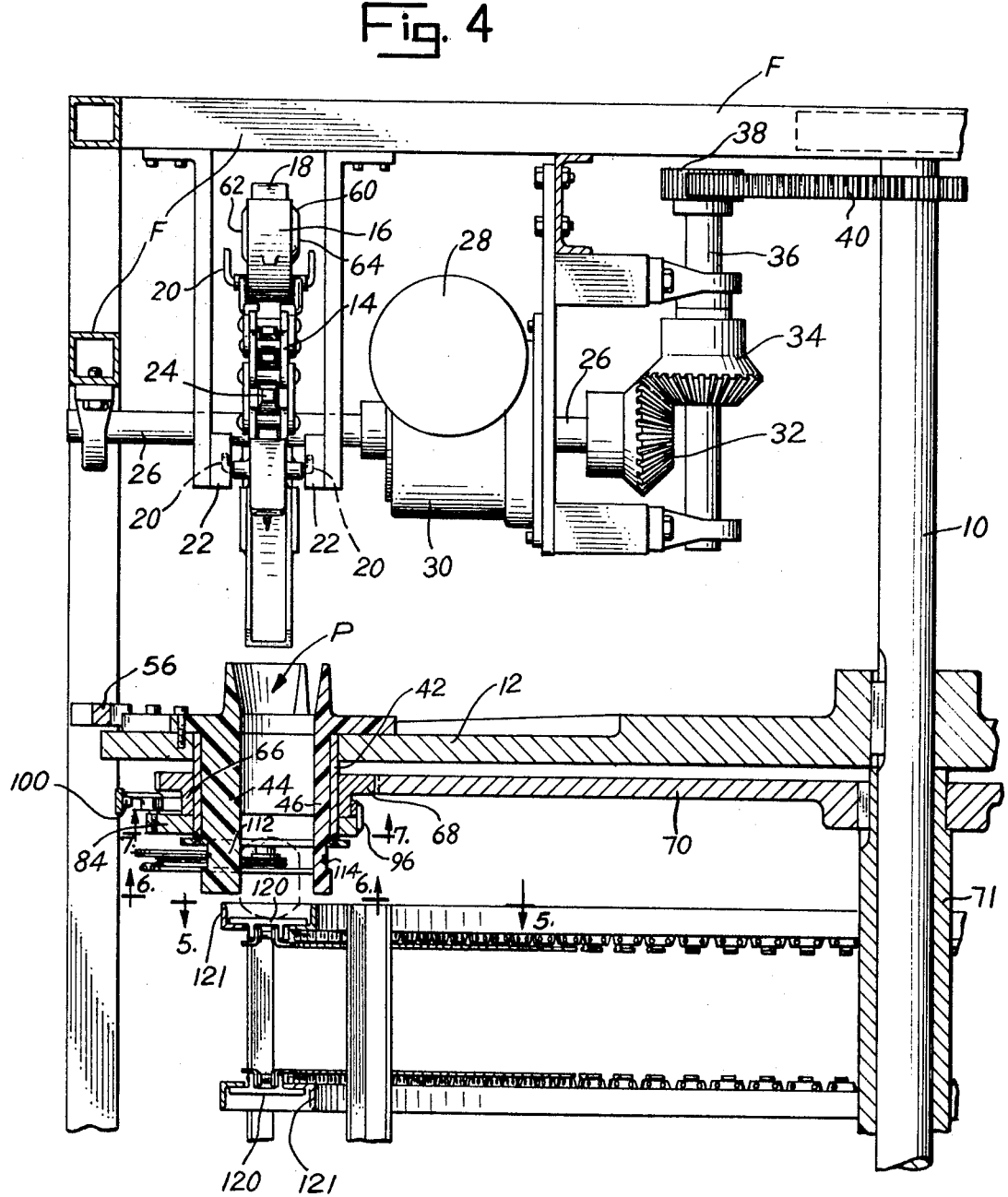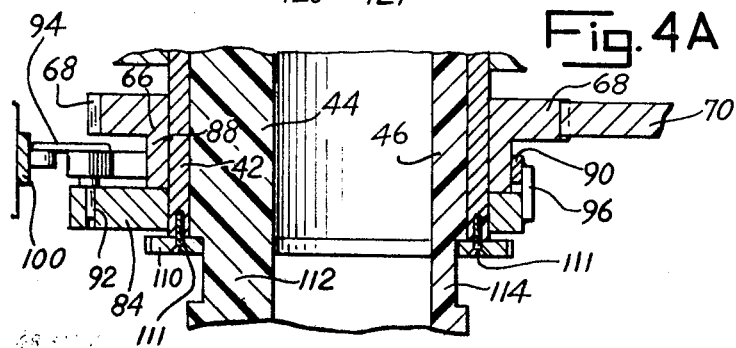

Sept. 21, 1971     G. J. ORLOWSKI     3,606,917
PEELING MACHINE
Filed May 26, 1969     4 Sheets-Sheet 4
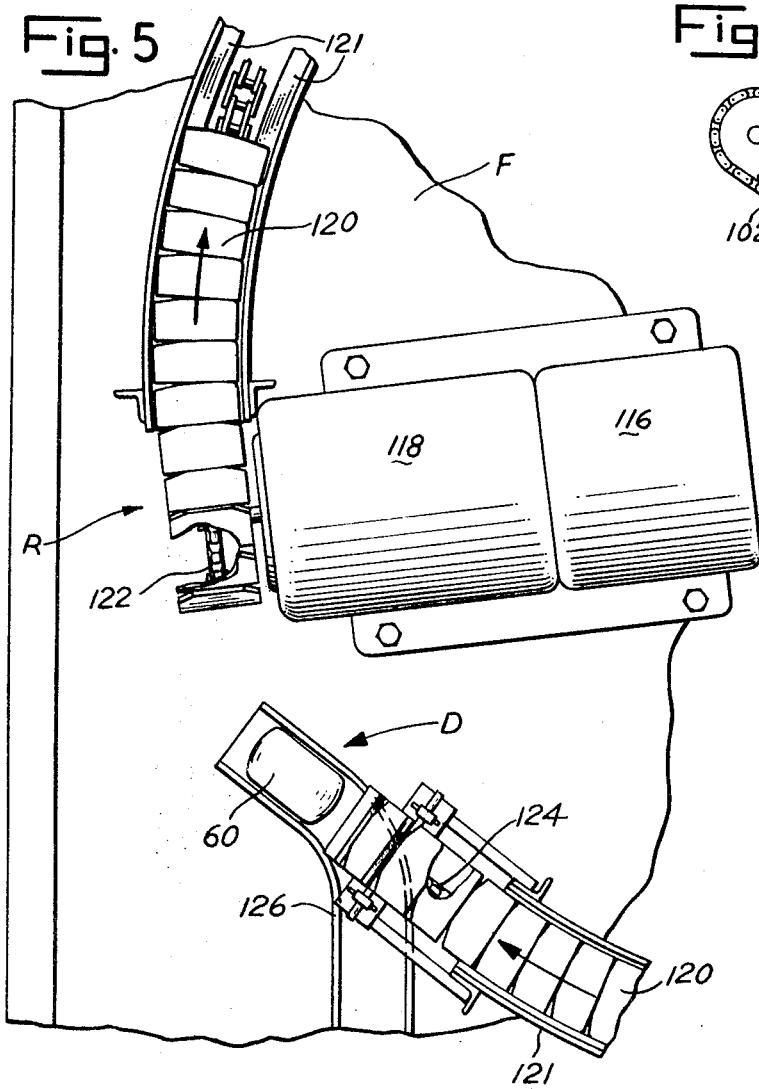
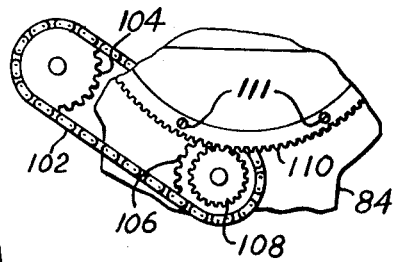
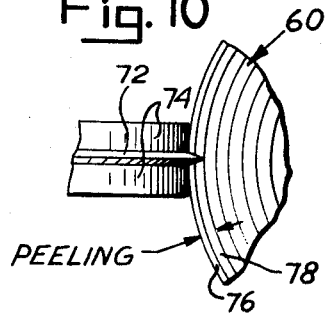
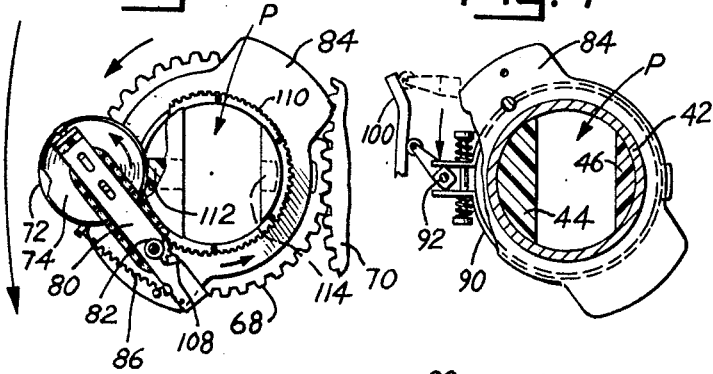
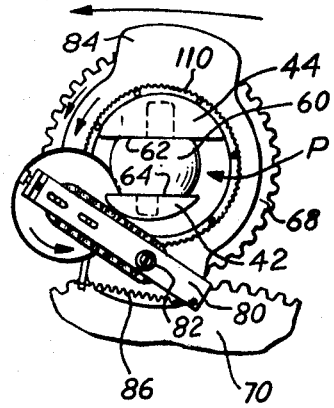
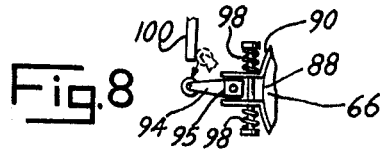
INVENTOR.
GERALD J. ORLOWSKI
BY *Bair, Freeman & Molinare*
ATTORNEYS United States Patent Office 3,606,917
Patented Sept. 21, 1971

3,606,917
PEELING MACHINE
Gerald J. Orlowski, Chicago, Ill., assignor to
Korlow Corporation
Filed May 26, 1969, Ser. No. 827,672
Int. Cl. A23n 7/00
U.S. Cl. 146—43          28 Claims

ABSTRACT OF THE DISCLOSURE

A peeling machine particularly designed for peeling onions by first cutting through the peelings thereof whereupon the peelings may be removed by air jets, brushing, vacuum and/or flotation on water. Onions having the root and stem cut therefrom, with the resulting ends of the onions being in parallel planes are delivered one at a time to a pocket of the peeling machine. The pocket has a pair of paralell side elements which cooperate with the parallel onion ends and orient the onion so that it can be rotated about its root-stem axis. While being so rotated, a specially designed peeling cutting blade revolves around the onion to cut through only its peeling. The cut peelings are then removed whereupon the peeled onions are in condition for discharge from the peeling machine.

A plurality of the pockets may be mounted on a carrier such as rotating disc for increased production from the machine, and the onions may be delivered to the successive pockets at a reception station of the machine and discharged therefrom at a discharge station of the machine.

BACKGROUND OF THE INVENTION

My peeling machine is particularly designed for peeling onions which may be delivered thereto from an end cutting machine of the type shown in my copending application Ser. No. 827,683, filed May 26, 1969 and which may deliver the peeled onions to a slicing machine such as one of the type shown in my copending application, Ser. No. 745,900, filed July 18, 1968, now Pat. No. 3,537,394, after which the sliced onions may be delivered to an onion ring separator of the kind shown in my copending application Ser. No. 776,065, filed Nov. 15, 1968, now Pat. No. 3,534,792.

Heretofore, the peeling of onions has been accomplished by the following methods:

(1) Tanks in which the onions are submerged in hot caustic soda so that their shells are softened and high pressure water jets can wash them off, final cleaning being by hand.

(2) Conveying means for conveying onions past torches or the like for burning the shells off, and again final cleaning must be by hand.

(3) After the ends are cut off, the shells can be blown off with air guns directed at them by hand providing very high pressure air, and (4) By hand peeling such as a housewife would do.

These prior methods are used for peeling onions whether to produce peeled onions, peeled and sliced onions, or peeled and sliced onions which are then separated into onion rings for producing "French fried onion rings." Methods 1, 2 and 3 just described do not insure removal of the onion "peeling" which for French fried onion rings must be both the shell which is a first layer and the second layer which, though not nearly as tough as the shell, is too tough to be suitable for use and must therefore be discarded. Hereinafter I shall refer to an onion "peeling" as the shell and the second layer just referred to.

In view of the foregoing paragraph, one object of my present invention is to provide an onion peeling machine wherein a pocket is provided for receiving onions having parallel ends such as produced by my end cutting machine hereinbefore referred to, and wherein the pocket has side elements which provide a stationay flat surface and floating flat surface parallel thereto, the floating flat surface being lightly spring biased so as to engage the opposite parallel ends of the onion between the two flat surfaces to hold the onion oriented during the peeling operation.

Another object is to provide the side elements of the pocket movable relatively away from each other to receive the unpeeled onion whereupon they are permitted to close during the peeling operation, and then again opened to discharge the peeled onion after the peeling has been removed therefrom.

Still another object is to provide means for rotating the onion on its root-stem axis while the light spring bias is in effect, the parallel ends of the onion thereby rotating against the parallel flat surfaces of the side elements of the pocket.

A further object is to provide means for revolving the peeling cutting blade around the onion to cut through the peeling from one end surface of the trimmed onion to the other end surface thereof which is parallel to the first-mentioned end surface.

Still a further object is to provide for multiple cuts through the peeling of the onion by the combination of rotating the onion and revolving the peeling cutting blade therearound.

An additional object is to further rotate the cutting blade itself for more effective cutting operation during the rotation of the onion and the revolution of the cutting blade therearound.

BRIEF SUMMARY OF THE INVENTION

A pocket is provided to receive onions one at a time which have their ends trimmed off in parallel planes, and means is provided to rotate the onion on its root-stem axis. During such rotation of the onion, peeling occurs at several locations so that the onion peeling can be removed by jets of compressed air thereagainst. The peeled onions are then in suitable condition for further processing such as slicing and onion ring separating for producing onion rings which are then processed to become French fried onion rings.

In addition to onions, other vegetables and fruit can be peeled in my peeling machine if they are of the type wherein cutting through the peeling is sufficient to permit subsequent removal of the cut peeling from the article by gravity, air jets, brushing, vacuum, water floatation and/or manual means.

BRIEF DESCRIPTION OF THE DRAWINGS

FIG. 2 is a plan view thereof;

FIG. 3 is an enlarged plan view of one of the article receiving pockets of the peeling machine;

FIG. 4 is a vertical sectional view on the line 4—4 of FIG. 2 and is enlarged with respect to FIGS. 1 and 2;

FIG. 4A is a further enlargement of a portion of FIG. 4;

FIG. 5 is a plan view of a special type of conveyor chain and operating means therefor used in my peeling machine, and is enlarged when compared with FIG. 2;

FIG. 6 is a bottom plan view on the line 6—6 of FIG. 4 showing certain details of a peeling cutting mechanism;

FIG. 7 is a similar but partially sectioned view on the line 7—7 of FIG. 4 showing other details of the peeling cutting mechanism;

FIG. 8 is a fragmentary showing of a portion of FIG. 7 to show the release of a clutch;

FIG. 9 is a bottom plan view similar to FIG. 6 but rotated 90° therefrom and shows a peeling cutting operation of the peeling cutting blade;

FIG. 10 is an enlarged diagram of a portion of an onion and an adjacent portion of a peeling cutter showing a peeling cut-through operation; and FIG. 11 is an enlargement of a portion of FIG. 9 to show a peeling cutter drive means.

DESCRIPTION OF THE PREFERRED EMBODIMENTS

Figure 1:
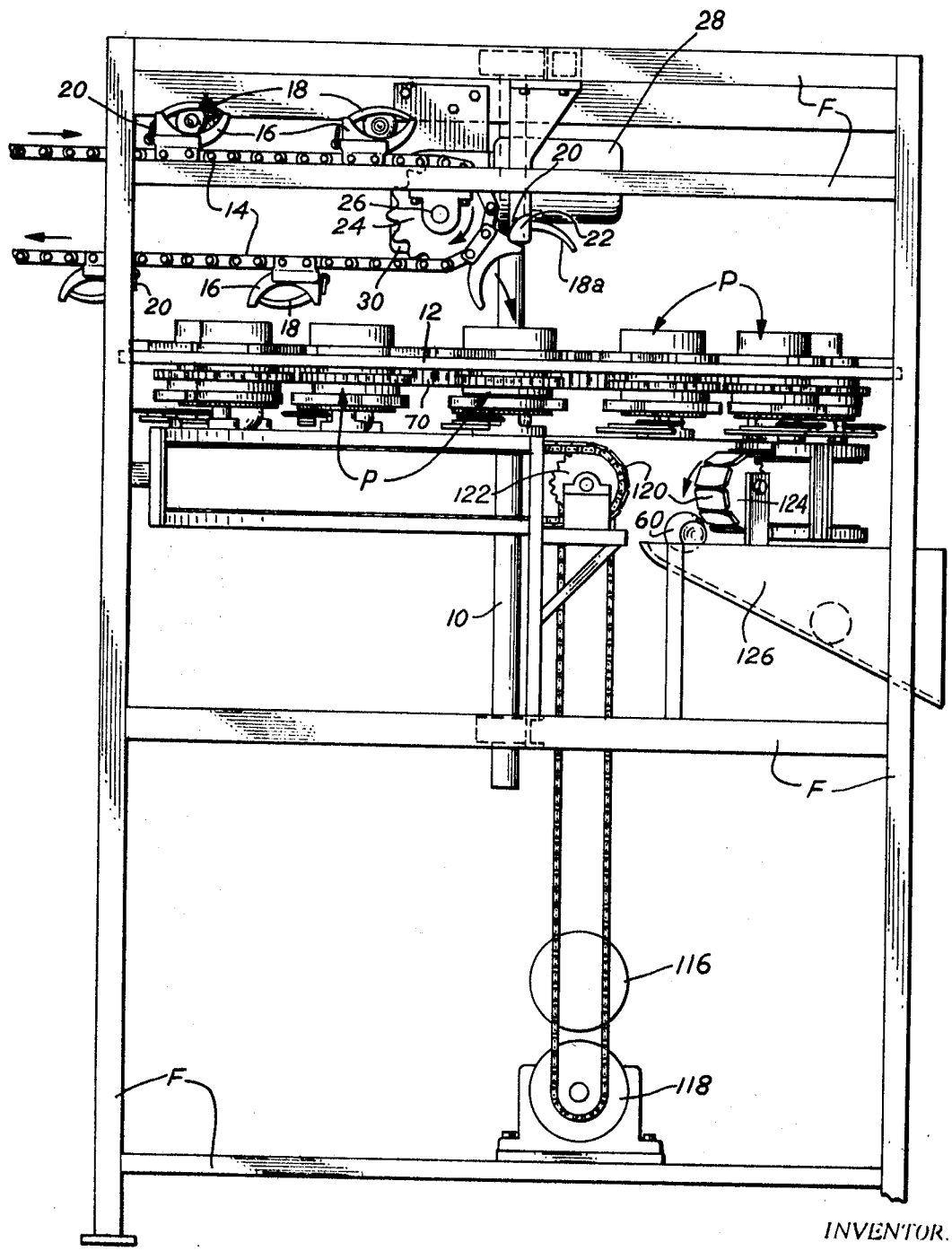
FIG. 1 is a side elevation of a peeling machine embodying my invention.

On the accompanying drawings I have used the reference character F to indicate in general a frame of my peeling machine which may be formed of square stainless steel tubing, the elements of which are welded together. Also the frame is designed to be covered by stainless steel panels which panels are omitted from the drawings in order to show details.

A vertical main shaft 10 is journalled in the frame F and a carrier disk 12 is keyed thereto as shown in section in FIG. 4, and is adapted to carry a plurality of article receiving pockets P, the details of which will be hereinafter described.

An article conveyor 14 is illustrated in FIGS. 1, 2 and 4 for delivering articles to the successive pockets P. The article conveyor is shown as a chain and may form part of an end cutting or trimming machine for onions and the like as shown and claimed in my copending application, Ser. No. 827,683, hereinbefore referred to.

As far as the present peeling machine is concerned, the article conveyor 14 carries spaced pockets 16 of arcuate shape to which clamp arms 18 are pivoted. The clamp arms are biased to closed or article-holding positions but may be opened as at 18a in FIG. 1 by cam arms 20 thereof engaging a stationary cam 22 as the conveyor chain 14 travels in the direction of the arrows shown in FIG. 1. The cam is located adjacent a drive sprocket 24 around which the chain passes.

For driving the sprocket 24 and also the main shaft 10 in order to accurately time the two in relation to each other, a drive shaft 26 is provided operated from an electric motor or the like 28 through suitable step-down gearing in a housing 30. By means of bevel gears 32 and 34, a countershaft 36, and a pinion 38 meshing with a gear 40 on the main shaft 10, rotation of the drive shaft 26 effects rotation of the main shaft 10 at the rate of one pocket P arriving at a receiving station R shown in FIG. 2 and simultaneously another pocket P arriving at a discharge station D while the spaced pockets 16 on the article conveyor 14 arrive at the receiving station R at the same rate as the pockets P.

Describing now the details of a pocket P, and referring to the pocket shown in section in FIGS. 4 and 4A (12 pockets being illustrated as will be noted in FIG. 2), a vertical bearing sleeve 42 is carried by the carrier disk 12, and located therein is a stationary pocket side element 44 and a movable pocket side element 46. Referring to FIG. 3, the stationary pocket side element 44 is mounted on the disk 12 as by three screws 48 whereas the movable pocket side element 46 is carried by a C-shaped plate 50 having a cam arm 52, three slotted connections 54 being provided between the plate 50, 52 and the disk 12. A cam bar 56 is shown for moving the plate 50, 52 to the full line position illustrated against the bias of a spring 58. After the cam arm 52 is passed by the cam 56, the spring 58 returns the plate 50, 52 to the dot-and-dash line position illustrated if there is no onion in the pocket P. If there is an onion in the pocket P, then the onion is lightly frictionally engaged by the facing surfaces of the pocket side elements 44 and 46 as the spring 58 is relatively light, and the movable pocket side element 46 does not return all the way to the dot-and-dash line position shown as the closed position of the pocket presents a distance between the side elements 44 and 46 less than the thickness of the onion measured across parallel ends thereof as shown in FIG. 2 at ten pockets of the carrier disk 12, that is all but the two stations indicated R for receiving station and D for discharge station. To further elaborate, the reference numeral 60 is used to indicate onions, and 62 and 64 are the parallel ends thereof where the root and stem have been trimmed off in my end cutting machine hereinbefore referred to.

Referring again to FIG. 4 and also to FIGS. 6, 7, 8 and 9, a peeling cutting blade carrier 66 of cylindrical character is rotatable on the bearing sleeve 42, and is rotated by reason of an integral pinion 68 thereof meshing with a gear 70. The gear 70 is carried by a sleeve 71 which may be stationary or rotated in either direction, depending on the speed of revolution desired for the cylindrical carrier 66. Accordingly, as the carrier disk 12 rotates with the main shaft 10 the pinion 68 being carried thereby is rotated by its meshing relationship with the gear 70.

A peeling cutting blade 72 in the form of a metal disk with a serrated edge is carried by the carrier 66, and is mounted between a pair of gauge disks 74 as shown particularly in FIG. 10 wherein the relationship of the blade 72 and the disks 74 to the onion 60 is shown. An onion has a tough "shell" 76 next to which is a first layer 78 followed by second, third and fourth layers and so on. In the preparation of onion rings for french frying it is desirable to "peel" the onion, taking into consideration that the "peeling" consists of the shell 76 and the first layer 78 as this first layer is too tough to be suitable for use and should be discarded. Accordingly, by providing a blade 72 having a diameter such as shown in relation to the gauge disks 74, the peripheries of the gauge disks limit the depth of cut of the blade to the shell 76 plus the first layer 78 in an entirely automatic manner if the assembly of gauge disks and peeling cutting blade are biased toward the surface of the onion.

The blade 72 and the gauge disks 74 are rotatably carried by an arm 80 pivoted at 82 on a flange 84 at the lower end of the cylindrical carrier 66 whereas the pinion 68 is on the upper end thereof (see FIG. 4). A spring 86 biases the arm 80 and thereby the blade 72 toward the onion 60 as shown in FIG. 9. The flange 84 is rotatable on the bearing sleeve 42 and is also rotatable therewith by reason of a clutch connection provided between the flange 84 and the carrier 66. The carrier has a clutch band surface 88 below the pinion 68. The flange 84 carries a pin 92 on which a clutch lever 94 is pivoted, a clutch band 90 being shown surrounding the clutch band surface 88 and anchored by a bracket 96 to the flange 84. As shown in FIGS. 7 and 8 a pair of springs 98 bias the clutch band 90 into operative engagement with the clutch band surface 88, but when the lever 94 is swung from the position of FIG. 8 to the position of FIG. 7 by a stationary cam 100, the clutch band band is released for a purpose which will hereinafter appear.

In addition to the gauge disks 74 and the peeling cutting blade 72 revolving around the onion 60, it is desirable to rotate the blade for efficient cut-through action and the disks, and this is accomplished by a chain drive 102 and sprockets 104 and 106. The sprocket 104 rotates the blade 72 and the disks 74 whereas the sprocket 106 is rotated by a pinion 108 meshing with a gear 110 secured to the lower end of the tubular carrier 66 by six screws 111 as shown in FIGS. 9 and 6 whereby this gear 110 is stationary relative to the tubular carrier and therefore the revolution of the flange 84 and the blade 72 around the onion is translated into rotation of the blade as the pinion 108 is carried around the periphery of the gear 110.

By the arrangement just disclosed the peeling cutting blade 72 cuts through the peeling of the onion 60 from one parallel end 62 to the other parallel end 64 thereof as shown in FIG. 9 while the side elements 44 and 46 are closed, but is swung outwardly as in FIG. 6 as it passes across the end 62 or 64 of the onion as the case may be by contact of the gauge disks 74 with abutments 112 or 114 of the side elements 44 and 46 respectively, which abutments are reduced portions of these side elements formed by notches therein as shown in FIGS. 4 and 6, to permit full peeling contact and cutting by the blade 72 from one end face 62 to the other end face 64 of the onion and thereby insure full peeling strokes to loosen the peeling sufficiently that it may be removed by the play of jets of compressed air thereagainst.

Such jets of compressed air issue from nozzles which communicate with a manifold 128 shown in FIG. 2. Three nozzles 130 are located above the carrier disk 12 and point toward an onion in a pocket P in a direction opposite the direction of rotation of the disk. These nozzles are inclined downwardly. Another three nozzles 132 are located below the disk and are inclined upwardly. Further nozzles 134 and 136 above and below the disk may be provided pointing downwardly and upwardly respectively. Obviously any number of nozzles directed suitably may be used as required for stripping the peelings away from the onions once their peelings are cut through by the cutting blades 72.

In order to effect rotation of the onions 60 between the pocket sides 44 and 46, they roll on a suitable surface such as a linked conveyor 120 shown in FIG. 5, the links being so designed that they can travel in a circle as illustrated directly below the circle of pockets P. A drive sprocket 122 and an idler sprocket 124 are provided at opposite ends of the conveyor 120, which is chain-like in character, and the sprocket 122 may be driven by a step down gearing 118 from a motor 116. Alternatively, a stationary surface may be provided instead of the conveyor 120 so that the onions merely roll thereon like rollers, whereas the provision of the conveyor 120 permits controlled rotation of the onions, either increasing their rotation by driving the conveyor 120 counterclockwise or decreasing their rotation by driving it clockwise. The resulting rolling action of the onions while the cutter blade 72 is revolving around them provided for a plurality of cuts through the onion peelings before the onions reach the nozzles 130, 132, 134 and 136.

The onions released at the discharge station D are oriented with respect to a chute 126 shown in FIG. 5 so that the parallel ends 62 and 64 of the onions are guided by the sides of the chute 126 and thereby properly oriented with respect to the intake of my onion slicing machine hereinbefore referred to.

From the foregoing specification it will be obvious that a machine for automatically peeling onions is provided which operates efficiently to cut through the shell and second layer of the onion with a plurality of cuts that so shred the peeling in a number of places that jets of compressed air can blow it off thus conditioning the peeled onion for my slicing machine.

I claim as my invention:

1. An onion peeling machine comprising a pocket to receive an onion from which the root and stem have been trimmed, with the trimmed ends of the onion in planes substantially parallel to each other and substantially normal to the root-stem axis of the onion, said pocket having parallel side elements engaging said ends of the onion to orient it with respect to said pocket, means to cut through the peeling of the onion while it is held so oriented, said last means revolving around the onion in substantially the plane of said root-stem axis, and means for rotating the onion between said side elements so that said means to cut through the peeling of the onion acts on successive areas of the onion while it is revolving around the onion.

2. An onion peeling machine in accordance with claim 1 wherein said side elements are notched at substantially the center of the onion and said means to cut through the onion peeling travels through the notches thereof.

3. An onion peeling machine in accordance with claim 1 wherein said side elements are biased relatively toward each other to frictionally engage the ends of the onion while the peeling of the onion is being cut through.

4. An onion peeling machine in accordance with claim 3 wherein means is provided to spread said side elements relative to each other for receiving an onion to be peeled.

5. An onion peeling machine in accordance with claim 3 wherein means is provided to spread said side elements relative to each other for releasing the peeled onion.

6. An onion peeling machine in accordance with claim 4 wherein means is provided to also spread said side elements relative to each other for releasing the peeled onion.

7. An onion peeling machine in accordance with claim 1 wherein said means to cut through the onion peeling comprises a disc-like blade, and means is provided to rotate said blade as it revolves around the onion.

8. An onion peeling machine in accordance with claim 7 wherein means is provided for limiting the depth of cut of said disc-like blade relative to the onion.

9. An onion peeling machine in accordance with claim 8 wherein said means for limiting the depth of cut comprises a smaller-diameter gauge disc adjacent one side of said disc-like blade to engage the outer surface of the onion being peeled, the marginal periphery of said disc-like blade projecting beyond the circumference of said gauge disc a distance substantially equal to the peeling of the onion.

10. An onion peeling machine comprising a pocket to receive an onion from which the root and stem have been trimmed, with the trimmed ends of the onion in planes substantially parallel to each other and substantially normal to the root-stem axis of the onion, said pocket having parallel side elements engaging said ends of the onion to orient it with respect to said pocket and being in the form of a cylinder, said parallel side elements being located inside said cylinder, said side elements engaging said ends of the onion to orient it with respect to said pocket, and means mounted on said pocket to cut through the peeling of the onion while it is held so oriented, said last means revolving around the onion in substantially the plane of said root-stem axis.

11. An onion peeling machine in accordance with claim 10 wherein said means to cut through the onion peeling comprises a disc-like blade, and means is provided for limiting the depth of cut of said disc-like blade into the onion.

12. An onion peeling machine in accordance with claim 1 wherein nozzles are provided to discharge compressed air against the onions to remove the cut peelings therefrom after they have been cut by said means to cut through the peeling thereof.

13. An onion peeling machine in accordance with claim 7 wherein said means for rotating said disc-like blade includes a pinion rotatable around said pocket, means for effecting rotation thereof, an arm is pivoted to said pinion on which said disc-like blade is mounted, an operative connection is provided between said pinion and said disc-like blade for rotating the blade from the pinion, and means is provided for biasing said arm in a direction to engage said disc-like blade carried thereby with the onion during the peeling cutting operation.

14. An onion peeling machine in accordance with claim 13 wherein the means for effecting rotation of said pinion comprises a gear meshing with said pinion, said pinion being rotatably carried by a carrier disc which rotates said pinion around said gear.

15. An onion peeling machine comprising a carrier disc having an axis of rotation, a plurality of pockets mounted on said carrier disc and passing through a reception station and a discharge station, said pockets receiving onions from which the roots and stems have been trimmed, with the trimmed ends of the onions in planes substantially parallel to each other and substantially normal to the root-stem axes of the onions, said pockets having parallel side elements engaging said ends of the onions to orient them with respect to said pockets, and means to cut through the peelings of the onions while they are held so oriented, said last means revolving around the onions in substantially the plane of said root-stem axes.

16. An onion peeling machine in accordance with claim 15 wherein said means to cut through the onion peeling comprises a disc-like blade, means is provided to rotate said blade as it revolves around the onion, said means for rotating said disc-like blade includes a pinion rotatable around said pocket, a gear surrounding the axis of said carrier disc and meshing with said pinion, an arm pivoted to said pinion on which said disc-like blade is mounted, an operative connection from said pinion to said disc-like blade for rotating the blade from the pinion, and means is provided for biasing said arm in a direction to engage said disc-like blade carried thereby with the onion during the peeling cutting operation.

17. An onion peeling machine in accordance with claim 16 wherein means is provided adjacent said receiving station to pivot said arm to a position of non engagement of said disc-like blade with the onion to permit the onion to enter said pocket without interference by said disc-like blade.

18. An onion peeling machine in accordance with claim 16 wherein means is provided adjacent said discharge station to pivot said arm to a position of non engagement of said disc-like blade with the onion to permit the onion to be released from said pocket.

19. An onion peeling machine in accordance with claim 15 wherein between said discharge station and said receiving station nozzles are provided to discharge compressed air against the onions to remove the cut peelings therefrom.

20. An onion peeling machine in accordance with claim 1 wherein said means for rotating the onion between said side elements comprises a surface below the onions on which they roll.

21. An onion peeling machine in accordance with claim 1 wherein said means for rotating the onion effects such rotation while the onions are held oriented by said side elements.

22. An onion peeling machine in accordance with claim 7 wherein said means to rotate said disc-like blade includes a pinion rotatable around said pocket, a gear meshing therewith and around which said pinion rolls, an arm pivoted to said pinion on which said disc-like blade is mounted, an operative connection is provided from said cylinder to said blade for rotating it as said pinion rotates around said cylinder, and means is provided biasing said arm in a direction to engage said disc-like blade carried thereby with the onion during the peeling cutting operation.

23. An onion peeling machine in accordance with claim 16 wherein means is provided adjacent said receiving station to pivot said arm to a position of non engagement of said disc-like blade with the onion to permit receiving the onion between said side elements without interference by said blade.

24. An onion peeling machine in accordance with claim 23 wherein means is provided to also stop the rotation of said disc-like blade when said arm is swung to non engaging position of said blade relative to the onion.

25. An onion peeling machine in accordance with claim 15 wherein means is provided for moving said side elements relatively away from each other at said receiving station to receive an onion in said pocket and when delivering peeled onions therefrom at said discharge station, and for moving said side elements relatively toward each other between said receiving and discharge stations to hold the onions oriented while said means for cutting through the peelings thereof is in operation.

26. An onion peeling machine in accordance with claim 25 wherein said means for cutting through the peelings of the onions comprises a cutting blade having carrying means therefor rotatable around said pocket and engagable with the onion, and means for rotating the carrying means for said cutting blade around the onion held in said pocket by said side elements.

27. An onion peeling machine in accordance with claim 10 wherein means is provided to rotate the onions including a surface on which they may roll while held oriented by said side elements and while said cutting blade is revolving therearound.

28. An onion peeling machine in accordance with claim 27 wherein said means to rotate the onions is a conveyor, and means is provided for driving said conveyor for controlling the rotation of said onions between said side elements of said pocket.

References Cited

UNITED STATES PATENTS

| | | | |
|---|---|---|---|
| 2,130,980 | 9/1938 | Chattin et al. | 146—43 |
| 3,112,779 | 12/1963 | Roberts | 146—43 |
| 3,485,279 | 12/1969 | Parsons | 146—43X |

WILLIE G. ABERCROMBIE, Primary Examiner